May 9, 1950 W. J. MORRILL 2,507,041
RECORD RELEASING MECHANISM
Filed March 17, 1945
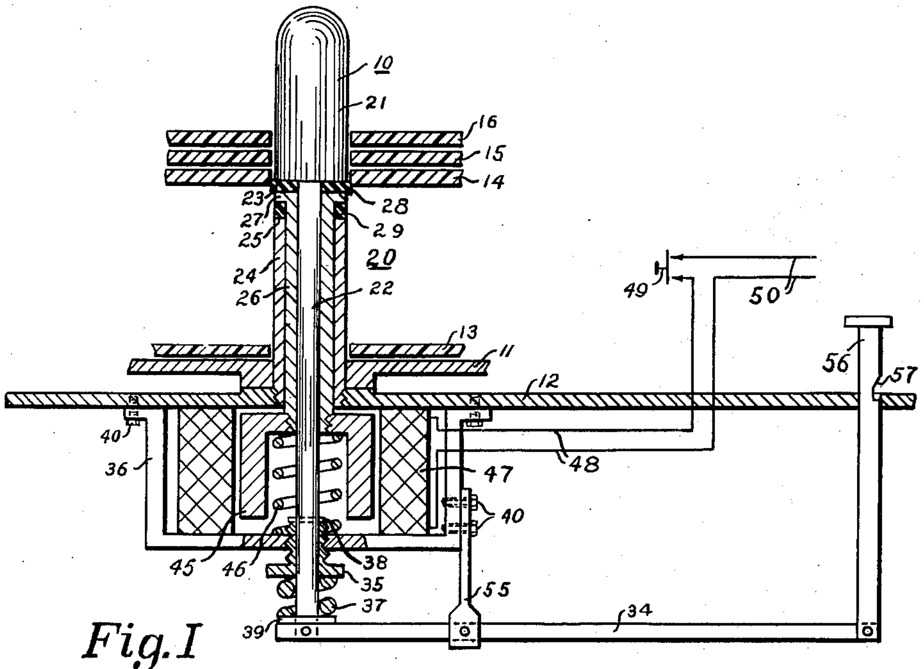
Fig. I
Fig. 5
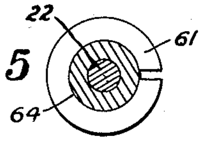
Fig. 6
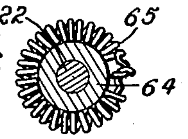
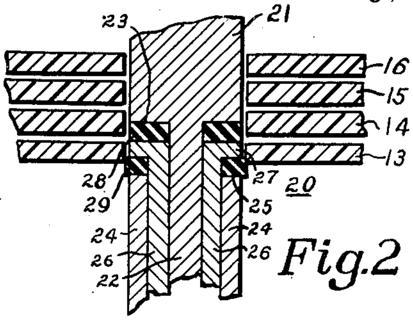
Fig. 2
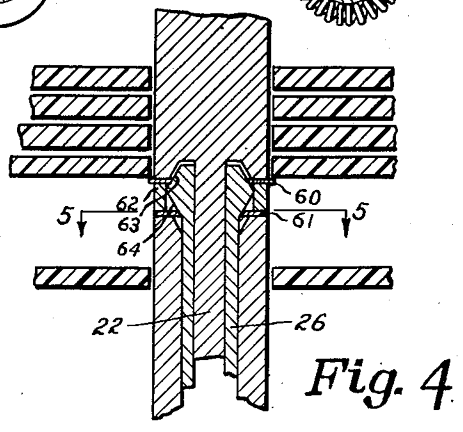
Fig. 4
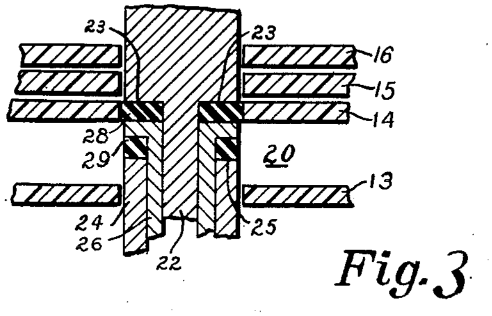
Fig. 3
INVENTOR.
Wayne J. Morrill
BY
Woodling and Krost
attys Patented May 9, 1950

2,507,041

UNITED STATES PATENT OFFICE 2,507,041

RECORD RELEASING MECHANISM

Wayne J. Morrill, Fort Wayne, Ind.

Application March 17, 1945, Serial No. 583,359

2 Claims. (Cl. 274—10)

My invention relates in general to a record changer mechanism and a process for changing records, and in particular to a record changer mechanism located in the spindle or shaft about which the records rotate.

An object of my invention is the provision of an automatic record changer for a record player, the changer parts being incorporated in the spindle or shaft about which the records rotate.

Another object of my invention is the provision of a record changer which is independent of the outside diameter of the records.

A further object of my invention is the construction of a spindle or shaft upon which records may be stacked above the turntable and having a record releasing mechanism incorporated therein which lowers the records one at a time from the stack to the turntable.

Another object of my invention is the provision of a spindle or shaft upon which the records may be supported above the turntable and having radially expansible rings of rubber-like material which may be actuated for lowering the records one at a time from the stack to the turntable.

Another object of my invention is the provision of a spindle or shaft upon which the records may be supported above the turntable and having radially extensible means which may be actuated for lowering the records one at a time from the stack to the turntable.

Other objects and a fuller understanding of my invention may be had by referring to the following description and claims, taken in conjunction with the accompanying drawings, in which;

Figure 1 is a cross-sectional view of a record changer embodying the features of my invention;

Figures 2 and 3 are fragmentary and enlarged views of Figure 1 illustrating the record releasing means in two stages of operation;

Figure 4 is a fragmentary and enlarged view illustrating a modification of the record releasing means;

Figure 5 is a cross-sectional view taken along the line 5—5 of Figure 4 and shows particularly the plan view of a split washer; and Figure 6 is a view similar to Figure 5 but shows a coil spring used instead of the split washer.

In my invention the record changer mechanism is incorporated in the shaft, about which the turntable rotates, thus making it independent of the outside diameter of the records. With reference to my drawing, the reference character 10 represents a shaft which projects upwardly from a turntable 11 rotated on a turntable support 12. Stacked about the shaft 10 are records 13, 14, 15 and 16. In the present commercially manufactured disc records, the outer portion of the record is thicker than the inner portion. When several records are stacked, there is a slight space between the adjacent records as illustrated. In Figure 1, I have shown records 13 on the turntable and the remainder of the records being held at an elevated distance above the turntable 11 by my record releasing mechanism 20, which is incorporated in the shaft 10. The record releasing mechanism 20 releases the records one at a time from the bottom of the stack, permitting them to fall to the turntable.

The shaft 10 has an upper shaft member 21 and a lower shaft member or stem 22 which extends through the turntable 11 and the turntable support 12. The upper shaft member 21 has an outside diameter substantially equal to the diameters of the openings in the records. The lower shaft member or stem 22 has a smaller diameter than the upper shaft member 21. At the junction of the upper shaft member 21 and the lower shaft member 22 is a shoulder 23. About the lower shaft or stem 22 is an outer stationary sleeve 24 which has an end surface 25 facing the shoulder 23, with a space therebetween. The outer stationary sleeve 24 has an outside diameter substantially equal to the diameter of the upper shaft member 21 and is held stationary by fastening it to the turntable support 12 by threads, as shown in the drawing, or by other suitable means. An actuating sleeve 26 is reciprocally mounted between the outer stationary sleeve 24 and the lower shaft member or stem 22. A flange 27 on the end of the actuating sleeve 26 extends into the space between the end surface 25 of the outer stationary sleeve 24 and the shoulder 23. The diameter of this flange 27 is substantially equal to the diameter of the upper shaft member 21. Between the flange 27 and the shoulder 23, is an upper radially expansible rubber-ring 28 which when expanded engages a record. Within the space between the flange 27 on the actuating sleeve 26 and the end surface 25 of the outer stationary sleeve 24 is a lower radially expansible rubber ring 29. When compressed axially by movement of the flange 27 toward end surface 25, the lower rubber ring 29 expands radially to engage a record.

The upper shaft member 21 and the stem 22 are held stationary in an axial direction during the operation of the record changing mechanism 20 by fastening the lower end of the stem 22 to one end of a lever arm 34. The length of the space between the end surface 25 and the shoulder 23 is controlled by raising or lowering the stem 22 by an adjustment sleeve nut 35 which surrounds a section of the stem 22 near the lower end thereof and which is threaded into a support 36. The support 36 is a substantially U-shaped member which may be fastened by bolts 40, or other suitable means to the under side of the turntable support 12. The upper end of the adjustment sleeve nut 35 engages or abuts a cross or stop pin 38 on the stem 22 and thus the stem 22 may be adjusted in a longitudinal position by turning the sleeve nut 35. I employ a heavy coil spring 37 between the sleeve nut 35 and a washer 39, which forms a support for the spring on the lever arm 34, to exert a downward force on the stem 22. The cross or stop pin 38 carried by the stem abuts against the adjustment sleeve nut 35 letting the spring 37 hold the upper shaft member 21 and stem 22 in an axially stationary position during operation of the record releasing mechanism 20.

The actuating sleeve 26 extends through the turntable 11 and the turntable support 12 and has a magnetizable hollow armature 45 fastened to the lower end thereof. The magnetizable hollow armature may be screwed on the end of the actuating sleeve 26, as shown in the drawing, or may be fastened thereto by any other suitable means. A coil spring 46 on the inside of the hollow armature 45 forces the hollow armature 45 and the actuating sleeve 26 in an upwardly direction from the support 36. The coil spring 46 is weaker than the coil spring 37. The forcing of the actuating sleeve 26 in an upward direction by the spring 46 moves the flange 27 toward the shoulder 23 to compress the upper rubber ring 28 axially of the shaft, thus expanding it radially of the shaft to engage a record. Surrounding the magnetizable hollow armature 45 is a magnetizing winding 47 which is supported by the U-shaped support 36. The magnetizing winding 47 is energized from a suitable source of current 50 through lead wires 48 by closing a push button switch 49 located in an accessible position for the operator. When the magnetizing winding 47 is energized, it cooperates with the magnetizable hollow armature 45 to pull the actuating sleeve 26 in a downwardly direction against the upward force of the spring 46. The movement of the actuating sleeve 26 in a downward direction moves the flange 27 toward the end surface 25 and away from the shoulder 23 to compress the lower rubber ring 29 axially, thus expanding it radially and simultaneously to allow the upper rubber ring 28 to expand axially and thus contract radially of the shaft.

In operation, the operator closes the push button switch 49 to energize the magnetizing winding 47 to release a record from the bottom of the stack and let it fall to the turntable. When attracted by the magnetizing winding the magnetizable hollow armature 45 pulls downwardly on the actuating sleeve 26, thus moving the flange 27 toward the end surface 25 of the outer stationary sleeve 24. As the flange 27 is moved toward the end surface 25 and away from the shoulder 23 the upper rubber ring 28 is allowed to expand axially of the shaft and contract radially of the shaft permitting the records 13 to 15 inclusive, to fall toward the turntable 11. Simultaneously, the lower rubber ring 29 is compressed axially between the flange 27 and the end surface 25 thus causing it to expand radially of the shaft to intercept record 13 of the falling records released by the upper rubber ring 28.

The record releasing mechanism 20 is held in this position, being the position illustrated in Figure 2, until the push button switch 49 is released. Upon release of the push button switch 49, the coil spring 46 moves the flange 27 upwardly away from the end surface 25 and toward the shoulder 23. Movement of the flange 27 toward the shoulder 23 axially compresses the upper rubber ring 28 and radially expands it to engage a record 14, to hold it above the turntable. As the flange 27 moves away from the end surface 25, the lower rubber ring 29 is allowed to expand axially of the shaft and thus contract radially of the shaft releasing the record number 13, and thus permitting it to fall to the turntable. The record releasing mechanism 20 is held in this position, as shown in Figure 3, by the coil spring 46 until the push button switch 49 is again closed.

After the records have been played they may be lifted from the turntable 11 as a stack by first pressing a release key 56 which is fastened to the actuating end of the lever arm 34 opposite the end which is fastened to the lower end of the stem 22. A fork-shaped member 55 fastened to the support 36 by bolts 40 or other suitable means, pivotally supports the lever arm 34 at a point remote from the stem 22. When the release key is pressed a notch 57 in the release key 56 engages the underneath edge of the turntable support 12 to hold the key in a downward position. While the key 56 is held in a downward position compressing the spring 37, the stem 22 is moved to an upward position to increase the length of the space between the end surface 25 and the shoulder 23. When the length of this space between the end surface 25 and the shoulder 23 is increased, both the radially expansible rubber rings 28 and 29 are contracted radially of the shaft to permit lifting of the stack of records from the turntable. Upon releasing the release key 56 the upper shaft member 21 and the stem 22 returns the record releasing mechanism 20 to the operating position as shown in Figure 1.

In Figure 4, I illustrate a second releasing mechanism which is a modification of the record releasing mechanism in Figure 3. In place of the radially expansible rubber rings, I use split washers made from a resilient material. These split washers, having reference numbers 60 and 61, are normally in a radially contracted position. For actuating the washers in an outward direction of the shaft, I employ oppositely disposed cam surfaces 63 and 64 on the flange of the actuating sleeve. A spacer ring 62 "floats" between the resilient split rings 60 and 61 to hold them from moving axially of the shaft. Operation of this modified record releasing mechanism is similar to the operation of the described record releasing mechanism shown in Figures 1, 2 and 3, in that when the actuating sleeve is forced toward the upper part of the shaft, cam surface 63 expands the upper split washer 60 outward of the shaft and when the actuating sleeve is forced away from the upper part of the shaft cam surface 64 expands the lower split washer 61 outwardly of the shaft, to engage a record.

The split washers radially expand outwardly of the shaft and engage the underneath surface of the record about its center opening. Thus, the record rests on the washers and is not supported by friction between the washer and the wall of the opening in the record.

A closely wound helical coil spring 65 as illustrated in Figure 5, may be used in place of the split washers which are illustrated in Figure 4, The closely wound helical coil spring 65 is normally contracted in a circular direction and thus contracted inwardly of the shaft. Axial movement of the actuating sleeve causes the cam surface to stretch the closely wound helical coil spring in a circular direction and thus move it outwardly of the shaft to engage the record. When the closely wound coil springs are employed the spacer ring is made thinner to make room for the springs. The use of the helical coil spring and operation of the record releasing mechanism is similar to the record releasing mechanism described in Figure 4.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. A turntable shaft for supporting a stack of records to be played in a record changer, said turntable shaft comprising a first member defining a first shoulder surface, a second member defining a second shoulder surface facing the first shoulder surface and spaced therefrom, first and second rings capable of radially expanding when compressed axially, said rings extending about the first member and being disposed between the first and second shoulder surfaces, said first ring engaging the first shoulder surface and said second ring engaging the second shoulder surface, an axially movable compressing member engaging and separating the said first and second rings, and means to move the compressing member towards the first shoulder surface to axially compress the first ring between the compressing member and the first shoulder surface causing said first ring to expand radially outwardly against one of said records and simultaneously permit the second ring to contract radially inwardly from another record, whereby said other record falls from the stack of records, and also to move the compressing member towards the second shoulder surface to permit the first ring to contract radially inwardly away from said one record, whereby said one record begins to fall, and simultaneously axially compress the second ring between the compressing member and the second shoulder surface causing said second ring to expand radially outwardly against the falling said one record.

2. In a turntable shaft for supporting a stack of records to be played in a record player, a stem over which the records may be placed, an upper shaft member carried by the stem and defining a shoulder surface extending about the stem, an outer sleeve fitted about the stem and having an end surface facing the said shoulder surface and spaced therefrom, first and second rings extending about the stem and disposed between the said surfaces, said first ring engaging the shoulder surface and said second ring engaging the end surface, said rings being capable of radially expanding upon axial compression, a compressing member engaging and separating the first and second rings and alternately movable axially of the stem, and actuating means to move the compressing member towards the shoulder surface to axially compress the first ring between the compressing member and the shoulder surface causing said first ring to expand radially outwardly against one of said records and simultaneously permit the second ring to contract radially inwardly from another record, whereby said other record falls from the stack of records, and also to move the compressing member towards the end surface to permit the first ring to contract radially inwardly away from said one record, whereby said one record begins to fall, and simultaneously axially compress the second ring between the compressing member and the end surface causing said second ring to expand radially outwardly against the falling said one record.

WAYNE J. MORRILL.

REFERENCES CITED

The following references are of record in the file of this patent:

UNITED STATES PATENTS

| Number | Name | Date |
|---|---|---|
| 1,438,000 | Underhill | Dec. 5, 1922 |
| 2,043,789 | Ansley | June 9, 1936 |

FOREIGN PATENTS

| Number | Country | Date |
|---|---|---|
| 822,026 | France | Sept. 6, 1937 |
| 62,695 | Denmark | Sept. 18, 1944 |